US006387529B1

(12) United States Patent
Peet

(10) Patent No.: US 6,387,529 B1
(45) Date of Patent: *May 14, 2002

(54) BIAXIALLY ORIENTED HDPE MULTILAYER FILM

(75) Inventor: Robert G. Peet, Pittsford, NY (US)

(73) Assignee: Exxon Mobil Oil Corporation, Fairfax, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,148

(22) Filed: Dec. 24, 1997

(51) Int. Cl.$^7$ ................................ B32B 27/08
(52) U.S. Cl. ...................... 428/516; 428/910
(58) Field of Search ................. 428/515, 516, 428/910, 35.7

(56) References Cited

U.S. PATENT DOCUMENTS

| | | | | |
|---|---|---|---|---|
| 3,258,455 A | * | 6/1966 | Natta et al. ............... 260/93.7 |
| 4,252,851 A | * | 2/1981 | Lansbury et al. ........... 428/336 |
| 4,460,631 A | * | 7/1984 | Stegmeier et al. ............ 428/35 |
| 4,565,739 A | * | 1/1986 | Clauson et al. ............. 428/349 |
| 4,725,466 A | * | 2/1988 | Crass et al. ................. 428/35 |
| 4,758,396 A | * | 7/1988 | Crass et al. ................. 264/145 |
| 4,762,737 A | * | 8/1988 | Lu ............................... 428/35 |
| 4,855,187 A | * | 8/1989 | Osgood, Jr. et al. ........ 428/516 |
| 4,870,122 A | * | 9/1989 | Lu ............................. 524/488 |
| 4,973,375 A | * | 11/1990 | Nishida et al. ............. 156/243 |
| 5,223,346 A | * | 6/1993 | Lu ............................. 428/516 |
| 5,254,394 A | * | 10/1993 | Bothe et al. ................ 428/212 |
| 5,270,276 A | * | 12/1993 | Job ............................ 502/123 |
| 5,302,442 A | * | 4/1994 | O'Brien et al. ............. 428/213 |
| 5,340,917 A | * | 8/1994 | Eckman et al. ............. 528/481 |
| 5,346,763 A | * | 9/1994 | Balloni et al. .............. 428/349 |
| 5,476,914 A | * | 12/1995 | Ewen et al. ................ 528/351 |
| 5,500,283 A | * | 3/1996 | Kirk et al. .................. 428/349 |
| 5,527,608 A | * | 6/1996 | Kemp-Patchett et al. ... 428/349 |
| 5,558,930 A | * | 9/1996 | DiPoto ....................... 428/216 |
| 5,620,803 A | * | 4/1997 | Oyama et al. .............. 428/516 |
| 5,691,047 A | * | 11/1997 | Kurauchi et al. ......... 428/315.7 |
| 5,834,562 A | * | 11/1998 | Silvestri et al. ............. 525/240 |
| 5,969,021 A | * | 10/1999 | Reddy et al. ............... 524/229 |
| 5,985,426 A | * | 11/1999 | Wilkie ........................ 428/215 |

* cited by examiner

Primary Examiner—Blaine Copenheaver
Assistant Examiner—Kevin R. Kruer
(74) Attorney, Agent, or Firm—Dennis P. Santini; Rick F. James

(57) ABSTRACT

The present invention relates to a biaxially oriented multilayer film structure having (i) a core substrate of high density polyethylene; and (ii) an additional layer of syndiotactic polypropylene on at least one surface of the core substrate. Optionally, the film of the present invention includes at least one heat sealable layer on the outer surface of the additional layer.

9 Claims, No Drawings

BIAXIALLY ORIENTED HDPE MULTILAYER FILM

BACKGROUND OF THE INVENTION

The present invention is directed to a biaxially oriented multilayer film, and particularly to a multilayer film having a core substrate of high density polyethylene.

Polymeric films are widely used in many industrial applications. One particularly important application is the food packaging industry. Films employed in the food packaging industry are chosen to provide barrier characteristics necessary for proper food containment. Such barrier characteristics include water vapor barrier, oxygen and gas barrier, as well as flavor and aroma barrier properties.

High density polyethylene (HDPE) is a polymer commonly employed in the manufacture of films used in the food packaging industry. In the case of multilayer films, high density polyethylene is commonly used in the base or core layer. Often, barrier coatings, heat sealable layers, and/or layers with additional functionalities are applied on the surfaces of the HDPE layer to provide improved barrier sealant and/or other properties. For example, U.S. Pat. No. 5,500,283 to Kirk et al. discloses a biaxially oriented film made with a core layer of HDPE coated with a conventional coating such as polyvinylidene chloride polymer, acrylic acid polymer or polyvinyl alcohol polymer.

U.S. Pat. No. 5,346,763 to Balloni et al. is directed to a multilayer film structure composed of a core layer of HDPE having a skin layer of maleic anhydride modified polyethylene on one side and a heat sealable or printable skin layer on the other side.

U.S. Pat. No. 5,302,442 to O'Brien relates to a film structure made with a thermoplastic film having a heat sealable layer on at least one side thereof The thermoplastic film can be a blend of HDPE and the heat sealable layer is a blend of terpolymer of ethylene, propylene and butene.

U.S. Pat. No. 5,558,930 to DiPoto discloses a multilayer film composed of at least a barrier film having thereon at least a sealant layer. The barrier film can be an HDPE polymer and the sealant layer is a conventional heat sealable thermoplastic material, e.g., ethylene vinyl acetate copolymer, ethylene methyl acrylate polymer, copolymers of ethylene, etc.

HDPE films used in packaging are very thin, and have relatively low tensile strength. Some films would be described as somewhat brittle or "splitty". These tend to break in manufacture and in use on packaging machines and equipment. The addition of the coating or heat sealable layers to the HDPE layer in the above patents does not produce biaxially oriented films having improved tensile properties that do not split during orientation or subsequent usage. This tendency to break hinders the machinability and processability of the films, resulting in increased manufacturing costs and/or films of inferior quality.

The present invention overcomes shortcomings of the prior art and improves the tensile properties of HDPE films as well as manufacturing capability for making biaxially oriented HDPE films.

SUMMARY OF THE INVENTION

The present invention is directed to a biaxially oriented multilayer film structure having (I) a core substrate of high density polyethylene (HDPE); and (ii) an additional layer of syndiotactic polypropylene on at least one side of the core substrate.

In one preferred embodiment, the film of the present invention includes at least one heat sealable layer on an outer surface of one or both of the additional syndiotactic polypropylene layers. The heat sealable layer can be composed of any conventional polymeric sealant material known in the art such as ethylene vinyl acetate copolymers, ethylene methyl acrylate copolymers, butene copolymers with ethylene, hexene copolymers with ethylene, octene copolymers with ethylene, ethylene acrylic acid copolymers, ethylene methacrylic acid copolymers, hexene-butene copolymers, ionomers, acid modified ethylene vinyl acetate copolymers, anhydride modified ethylene vinyl acetate copolymers, medium density polyethylenes, low density polyethylenes and mixtures thereof.

The core, additional syndiotactic polypropylene layer(s), and heat sealable layers can optionally include conventional additives. Examples of the additives include, but are not limited to, antiblocking agents, antistatic agents, antifogging agents and slip agents.

As a result of this invention there is advantageously provided a multilayer film exhibiting improved tensile properties.

The film of the present invention exhibits reduced water vapor transmission (WVTR) as well as other improved barrier properties and dead-fold.

The film of the present invention is heat stable and can advantageously be processed at high temperatures without undergoing degradation.

The film of the present invention also exhibits a high degree of processability, resulting in better quality film and reduced manufacturing costs, and good machinability.

For better understanding of the present invention, together with other and further objects, reference is made to the following description and its scope will be pointed out in the appended claims.

DETAILED DESCRIPTION OF THE INVENTION

The present invention is a biaxially oriented multilayer film structure having (I) a core substrate of high density polyethylene (HDPE); and (ii) at least one skin layer of syndiotactic polypropylene on at least one side of the core substrate.

The core substrate of the present invention is a relatively thin layer of HDPE. The thickness of the HDPE core substrate is from about 0.2 mils to about 10 mils, preferably from about 0.5 mils to about 3 mils, and more preferably from about 0.7 mils to about 2.5 mils.

The HDPE core substrate exhibits reduced water vapor transmission (WVTR), improved dead-fold, and other properties even when the total film thickness is reduced to less than about 1 mil (0.001 inch). The high density of the HDPE polymer provides improved stiffness in films. Films with a HDPE polymer core substrate may be used in a wide variety of packaging equipment including vertical form, fill and seal (VFFS), horizontal form, fill and seal (HFFS), and high speed horizontal slug wrapping equipment, among other types of equipment.

These packaging machines typically contain mechanical cycles in which the film goes through periods of rapid acceleration and deceleration as the film, progressing through the machine, is started and stopped. The increased MD elongation value of this film allows this film to resist snaps and breaks better than previous films.

The HDPE of the present invention includes polymers made with Ziegler-Natta or Phillips type catalysts, as well as metallocene catalysts. The HDPE of the present invention is a semicrystalline polymer available in a wide range of molecular weight as indicated by either MI or HLMI (melt index or high-load melt index).

The HDPE core substrate of the present invention can be composed exclusively of a single HDPE resin or a mixture of HDPE resins as disclosed in U.S. Pat. No. 4,870,122 issued to Lu, the disclosure of which is incorporated herein in its entirety. Films made with a blend of HDPE resins have shown some benefit in reducing the splittiness of the film, which manifests itself as a tendency of the film to break across the transverse direction (TD) during packaging on vertical, form, fill and seal (VFFS) machines. The blends of the HDPE polymers can include two or more polymers all of which preferably have densities of 0.95 g/cm$^3$ or greater.

The density of the HDPE polymer is in the range from about 0.94 to about 0.97 g/cm$^3$, preferably from about 0.95 to about 0.965 g/cm$^3$ as defined by ASTM.

The melting point of HDPE polymer of the present invention, measured by a differential scanning calorimeter (DSC), is in a range from about 120 to about 150° C., preferably from about 125 to about 135° C.

The HDPE polymer of the present invention has a melt index of greater than 0.1 to about 10.0, preferably about 0.2 to about 5.0, and most preferably about 0.6 to about 2.0.

The HDPE polymers of the present invention are also commercially available as Marlex TR-130 from Phillips Chemical Company, M6211 from Lyondell Petrochemicals, Co., and Dow XU 6151.302 from Dow Chemical Co., among others.

The HDPE core substrate of the present invention has an additional layer of syndiotactic polypropylene on at least one of its surfaces. The additional layer can be applied on the surface of the core substrate by any manner known in the art. Preferably, the additional syndiotactic polypropylene layer can be coextruded with the core substrate. Two additional layers can also be simultaneously coextruded on both sides of the core substrate. The addition of the syndiotactic polypropylene layer to the core substrate layer improves tensile properties of the resultant film. This in turn improves processability in the films allowing high production rates and high rates in packaging machines.

Syndiotactic polypropylenes have been found to have properties quite different from those of isotactic polypropylenes due to their chain microstructure and their crystallization properties. Syndiotactic polypropylenes of the present invention have a large portion of the pendant methyl groups on alternating sides of the polymer chain backbone. Isotactic polypropylenes have long chain segments in which the pendant methyl groups appear primarily on the same side of the polymer chain backbone.

The syndiotactic polypropylenes of the present invention can be produced by any manner known in the art and are commercially available. In general these syndiotactic polyolefins are typically made with activated cyclopentadienyl transition metal catalysts as described in U.S. Pat. No. 5,340,917 to Eckeman et al., the disclosure of which is incorporated herein in its entirety. These catalysts usually consist of two parts, the first part being a substituted or unsubstituted cyclopentadienyl transition metal complex, a substituted or unsubstituted indenyl transition metal complex, or substituted or unsubstituted fluorenyl transition metal complex, or other similarly functional species, and the second component currently being an alumoxane, preferably a methyl alumoxane, or a non-coordinating anion. The syndiotactic polypropylene for use in this invention is not limited to any specific catalyst complex and/or activator, however.

Syndiotactic polypropylene of the present invention is a polypropylene having high syndiotacticity. The syndiotactic pentad fraction of the syndiotactic polypropylene, measured by $^{13}$C-NMR, is from about 0.55 to about 0.98, preferably about 0.70 to about 0.98, and most preferably 0.75 to about 0.90.

The melting point of the syndiotactic polypropylene of the present invention is from about 100° C. to about 170° C., preferably from about 110° C. to about 160° C., more preferably from about 120° C. to about 150° C.

The melt flow of the syndiotactic polypropylene is from about 0.5 to about 15 g/10 min, preferably from about 1.5 to about 10 g/10 min, most preferably from about 1.5 to about 5 g/10 min.

The syndiotactic polypropylene suitable for this invention can include small amounts of ethylene copolymerized with the propylene. The ethylene content can be from about 0.1 to about 10%, preferably from about 0.1% to about 1% and most preferably from 0.1% to about 0.3%.

An example of a suitable syndiotactic polypropylene is, but is not limited to, EOD 95-02, from Fina Oil & Chemical Company.

The syndiotactic polypropylene layer of the present invention has a thickness ranging from about 0.01 mils to about 0.25 mils, preferably from about 0.02 mils to about 0.08 mils, and more preferably from about 0.02 mils to about 0.05 mils.

The film of the present invention optionally includes at least one heat sealable layer on the outer surface of the additional syndiotactic polypropylene layer(s). The heat sealable layer can be composed of any conventional polymeric material known in the art such as ethylene vinyl acetate copolymers, ethylene methyl acrylate copolymers, butene copolymers with ethylene, hexene copolymers with ethylene, octene copolymers with ethylene, ethylene acrylic acid copolymers, ethylene methacrylic acid copolymers, hexene-butene copolymers, ionomers, acid modified ethylene vinyl acetate copolymers, anhydride modified ethylene vinyl acetate copolymers, medium density polyethylenes, low density polyethylenes and mixtures thereof.

The heat sealable layer can be applied on the outer surface of the additional syndiotactic polypropylene layer(s) by any manner known in the art. Preferably, the heat sealable layer can be coextruded with the core substrate and additional layer(s). Two heat sealable layers can also be simultaneously coextruded on both outer surfaces of the additional layers. Heat sealable layers may be coated on the outer surfaces of the additional layer(s).

The addition of a heat sealable layer to the outer surface of the additional syndiotactic polypropylene layer(s) can further improve the water and other barrier properties of the resultant film. The outer surface layers may also be formulated with slip packages to provide better machinability of the film in packaging equipment.

The heat sealable layer of the present invention has a thickness ranging from about 0.005 mils to about 0.15 mils, preferably from about 0.01 mils to about 0.08 mils, and more preferably from about 0.01 mils to about 0.05 mils.

In order to further improve certain properties of the resultant film, effective amounts of additives such as antiblocking agents, antistatic agents, or slip agents may be blended in the base layer, additional syndiotactic polypropylene layer(s), or coating layer(s).

Suitable antiblocking agents include silica, talc, clay, sodium aluminum silicate, and conventional organic and inorganic antiblocks.

Suitable antistatic agents include alkali alkane sulfonates and essentially straight-chain, saturated aliphatic tertiary amines.

Suitable slip agents include aliphatic acid amides, aliphatic acid esters, waxes, metallic soaps and polydimethylsiloxanes.

The film of the present invention may be prepared employing commercially available systems for coextruding resins. As mentioned, the HDPE core substrate is coextruded with an additional layer of syndiotactic polypropylene on at least one of its surfaces. The polymers can be brought to the molten state and coextruded from a conventional extruder through a flat sheet die, the melt streams either being combined in an adaptor prior to entering the die or in suitable internal channels before being extruded from the die. After leaving the die orifice, the multilayer film structure is quenched. The film of the present invention is then biaxially oriented. After orientation, the edges of the film can be trimmed and the film wound onto a core.

The resultant film of the present invention is biaxially oriented. The resultant film is stretched from about 1.1 times to about 6 times, preferably from about 1.2 times to about 2 times in the machine direction (MD), and from about 2 times to about 12 times in the transverse direction (TD).

The resultant film of the present invention has a thickness ranging from about 0.3 mils to about 10 mils, preferably from about 0.5 mils to about 3 mils, and more preferably from about 0.7 mils to about 2.5 mils. The preferred resultant film is biaxially oriented.

The following examples further illustrate the present invention.

EXAMPLES

Example 1 below is a comparative example illustrating the properties of prior art film. Example 2 illustrates the improved and unexpected properties exhibited by the films of the present invention.

Example 1

Comparative Example

An HDPE resin (M6211) having a melt index of about 1.1 and, a density of about 0.96 was obtained from Lyondell Petrochemicals Co. of Houston, Tex. This was made into a film of about 1.1 mils thickness. The film was oriented about 1.2 times MD and about 9 times TD. The WVTR and oxygen barrier were measured and are set out below.

| SAMPLE NO. | 1 |
| --- | --- |
| WVTR - g/100 in$^2$, 24 hr, 100° F., 90% RH (ASTM D 1249-89) | 0.325 normalized to 1 mil thickness |
| TO$^2$ - cc/100 in$^2$/24 hr (ASTM D 3985-81) | 148 normalized to 1 mil thickness |
| Tensile Properties (MD elongation) | 521% |

Example 2

Film of the Present Invention

A three layer biaxially oriented film of Sample 2 having a thickness of about 1.15 mils was prepared by coextrusion. The two outside layers were skin layers of syndiotactic polypropylene (EOD 95-02 obtained from Fina Oil & Chemical Co.). The core substrate layer was an HDPE resin (M6211) having a melt index of about 1.1 and a density of about 0.96, obtained from Lyondell Petrochemicals Co. of Houston, Tex.

The ABA extrudate was quenched, reheated, and stretched 1.2 times in the machine direction. Subsequently, the MD oriented base sheet was stretched 9 times in the transverse direction.

| SAMPLE NO. | 2 |
| --- | --- |
| WVTR - g/100 in$^2$, 24 hr, 100° F., 90% RH (ASTM D 1249-89) | 0.31 normalized to 1 mil thickness. |
| TO$^2$ - cc/100 in$^2$/24 hr (ASTM D 3985-81) | 134 normalized to 1 mil thickness. |
| Tensile Properties (MD elongation) | 628% |

As demonstrated above, the film of the present invention exhibits better tensile properties, particularly MD elongation prior to break, as well as better water and oxygen barrier properties than the conventional film.

While there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. A biaxially oriented multilayer film structure comprising:
   (i) a core substrate having two surfaces, said core substrate consisting of high density polyethylene (HDPE); and
   (ii) a skin layer on at least one surface of said core substrate, said skin layer consisting of syndiotactic polypropylene having a melting point of from about 100° C. to about 150° C.,
   wherein said syndiotactic polypropylene is made with a metallocene catalyst and said biaxially oriented multilayer film structure further comprises at least one heat sealable layer on an outer surface of said skin layer.

2. The biaxially oriented multilayer film structure of claim 1, wherein said heat sealable layer comprises a polymeric material selected from the group consisting of ethylene vinyl acetate copolymers, ethylene methyl acrylate copolymers, butene copolymers of polyethylene, hexene copolymers of polyethylene, octene copolymers of polyethylene, ethylene acrylic acid copolymers, ethylene methacrylic acid copolymers, hexene-butene copolymers, ionomers, acid modified ethylene vinyl acetate copolymers, anhydride modified ethylene vinyl acetate copolymers, medium density polyethylenes, low density polyethylenes, and mixtures thereof.

3. The biaxially oriented multilayer film structure of claim 1, wherein said heat sealable layer further comprises one or more additives selected from the group consisting of antiblocking agents, antistatic agents, and slip agents.

4. The biaxially oriented multilayer film structure of claim 1, wherein said high density polyethylene (HDPE) is a mixture of HDPE resins.

5. A biaxially oriented multilayer film structure comprising:
  (i) a core substrate having two surfaces, said core substrate consisting of high density polyethylene (HDPE) and one or more additives; and
  (ii) a skin layer on at least one surface of said core substrate, said skin layer consisting of syndiotactic polypropylene having a melting point of from about 100° C. to about 150° C. and at least one of (a) from about 0.1 to about 10% of ethylene and (b) one or more additives selected from the group consisting of anti-blocking agents, antistatic agents, and slip agents,
wherein said syndiotactic polypropylene is made with a metallocene catalyst and said biaxially oriented multilayer film structure further comprises at least one heat sealable layer on an outer surface of said skin layer.

6. The biaxially oriented multilayer film structure of claim 5, wherein said one or more additives of said core substrate are selected from the group consisting of antiblocking agents, antistatic agents, and slip agents.

7. The biaxially oriented multilayer film structure of claim 5, wherein said heat sealable layer comprises a polymeric material selected from the group consisting of ethylene vinyl acetate copolymers, ethylene methyl acrylate copolymers, butene copolymers of polyethylene, hexene copolymers of polyethylene, octene copolymers of polyethylene, ethylene acrylic acid copolymers, ethylene methacrylic acid copolymers, hexene-butene copolymers, ionomers, acid modified ethylene vinyl acetate copolymers, anhydride modified ethylene vinyl acetate copolymers, medium density polyethylenes, low density polyethylenes, and mixtures thereof.

8. The biaxially oriented multilayer film structure of claim 5, wherein said heat sealable layer further comprises one or more additives selected from the group consisting of anti-blocking agents, antistatic agents, and slip agents.

9. The biaxially oriented multilayer film structure of claim 5, wherein said high density polyethylene (HDPE) is a mixture of HDPE resins.

* * * * *